US010583530B2

(12) United States Patent
Karp et al.

(10) Patent No.: US 10,583,530 B2
(45) Date of Patent: Mar. 10, 2020

(54) SYSTEM AND METHODS FOR FABRICATING A COMPONENT WITH LASER ARRAY

(71) Applicant: General Electric Company, Schenectady, NY (US)

(72) Inventors: Jason Harris Karp, Niskayuna, NY (US); Justin John Gambone, Jr., Watervliet, NY (US); Michael Evans Graham, Slingerlands, NY (US); David Charles Bogdan, Jr., Charlton, NY (US); Victor Petrovich Ostroverkhov, Ballston Lake, NY (US); William Thomas Carter, Galway, NY (US); Harry Kirk Mathews, Jr., Clifton Park, NY (US); Kevin George Harding, Niskayuna, NY (US); Jinjie Shi, Clifton Park, NY (US); Marshall Gordon Jones, Scotia, NY (US); James William Sears, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 344 days.

(21) Appl. No.: 15/401,643

(22) Filed: Jan. 9, 2017

(65) Prior Publication Data

US 2018/0193955 A1  Jul. 12, 2018

(51) Int. Cl.
*B23K 26/342* (2014.01)
*B33Y 30/00* (2015.01)
(Continued)

(52) U.S. Cl.
CPC .......... *B23K 26/342* (2015.10); *B22F 3/1055* (2013.01); *B29C 64/153* (2017.08);
(Continued)

(58) Field of Classification Search
CPC . B23K 26/342; B23K 2203/04; B22F 3/1055; B22F 2003/1056; B22F 2301/04
(Continued)

(56) References Cited

U.S. PATENT DOCUMENTS 6,217,695 B1 * 4/2001 Goldberg ................. B05D 3/06
156/244.17
9,266,170 B2   2/2016 Godfrey et al.
(Continued)

FOREIGN PATENT DOCUMENTS

CN         105268969      *  1/2016
DE    10 2015 211494 A1    12/2016
(Continued)

OTHER PUBLICATIONS

Extended European Search Report and Opinion issued in connection with corresponding EP Application No. 17206057.6 dated May 16, 2018.
(Continued)

*Primary Examiner* — Thien S Tran
(74) *Attorney, Agent, or Firm* — Armstrong Teasdale LLP

(57) ABSTRACT

A component is fabricated in a powder bed by moving a laser array across the powder bed. The laser array includes a plurality of laser devices. The power output of each laser device of the plurality of laser devices is independently controlled. The laser array emits a plurality of energy beams from a plurality of selected laser devices of the plurality of laser devices to generate a melt pool in the powder bed. A non-uniform energy intensity profile is generated by the plurality of selected laser devices. The non-uniform energy intensity profile facilitates generating a melt pool that has a predetermined characteristic.

15 Claims, 12 Drawing Sheets

(51) Int. Cl.
  *B22F 3/105* (2006.01)
  *B29C 64/153* (2017.01)
  *B29C 64/282* (2017.01)
  *B23K 103/04* (2006.01)

(52) U.S. Cl.
  CPC ............ *B29C 64/282* (2017.08); *B33Y 30/00* (2014.12); *B22F 2003/1056* (2013.01); *B22F 2301/00* (2013.01); *B23K 2103/04* (2018.08); *Y02P 10/295* (2015.11)

(58) Field of Classification Search
  USPC .............. 219/76.12, 121.64, 121.68, 121.78, 219/121.83
  See application file for complete search history.

(56) References Cited

U.S. PATENT DOCUMENTS

| | | | |
|---|---|---|---|
| 9,289,826 B2 | 3/2016 | Morris et al. | |
| 9,308,583 B2 | 4/2016 | El-Dasher et al. | |
| 2002/0148818 A1 | 10/2002 | Satou et al. | |
| 2014/0099476 A1 | 4/2014 | Subramanian et al. | |
| 2014/0212317 A1 | 7/2014 | Garry | |
| 2014/0271328 A1* | 9/2014 | Burris | B23K 26/034 419/53 |
| 2015/0045928 A1 | 2/2015 | Perez et al. | |
| 2015/0137426 A1 | 5/2015 | Van Esbroeck et al. | |
| 2015/0140152 A1 | 5/2015 | Chen | |
| 2015/0198052 A1 | 7/2015 | Pavlov et al. | |
| 2015/0268099 A1* | 9/2015 | Craig | G01J 5/0003 374/130 |
| 2016/0136730 A1* | 5/2016 | McMurtry | G02B 26/02 425/162 |
| 2016/0136759 A1 | 5/2016 | Broda | |
| 2016/0158889 A1 | 6/2016 | Carter et al. | |
| 2017/0304894 A1* | 10/2017 | Buller | B22F 3/105 |

FOREIGN PATENT DOCUMENTS

| | | |
|---|---|---|
| WO | 2015091485 A1 | 6/2015 |
| WO | 2016011290 A1 | 1/2016 |
| WO | 2016077250 A1 | 5/2016 |
| WO | 2016085965 A1 | 6/2016 |
| WO | 2016/201326 A1 | 12/2016 |
| WO | 2016/206781 A1 | 12/2016 |

OTHER PUBLICATIONS

Tang et al., "Melt pool temperature modeling and control for Laser Metal Deposition processes", American Control Conference, 2009. ACC '09., pp. 4791-4796, Jun. 10-12, 2009, St. Louis, MO.

Hinke et al., "Additive manufacturing: perspectives for diode lasers", High Power Diode Lasers and Systems Conference (HPD), 2015 IEEE, pp. 39-40, Oct. 14-15, 2015, Coventry.

M Baumers et al., "Combined build-time, energy consumption and cost estimation for direct metal laser sintering", 2012.

Straub et al., "Evaluation of the use of laser scanning to create key models for 3D printing separate from and augmenting visible light sensing", Multisensor, Multisource Information Fusion: Architectures, Algorithms, and Applications 2016, vol. 9872, May 19, 2016.

* cited by examiner

SYSTEM AND METHODS FOR FABRICATING A COMPONENT WITH LASER ARRAY

BACKGROUND

The subject matter disclosed herein relates generally to additive manufacturing systems and, more particularly, to methods and systems for fabricating a component using a laser array with a non-uniform energy intensity profile.

At least some additive manufacturing systems involve the buildup of a metal component to make a net, or near net shape component. This method can produce complex components from expensive materials at a reduced cost and with improved manufacturing efficiency. At least some known additive manufacturing systems, such as Direct Metal Laser Melting systems, fabricate components using an expensive, high-powered laser device and a powder material, such as a powdered metal. In some known additive manufacturing systems, component quality may be reduced due to excess heat and/or variation in heat being transferred to the metal powder by the laser device within the melt pool, creating a melt pool that includes, for example, varying depth and size.

In some known additive manufacturing systems, component quality is reduced due to the variation in conductive heat transfer between the powdered metal and the surrounding solid material of the component. As a result, the melt pool produced by the laser device may become, for example, too deep and large, resulting in the melt pool penetrating deeper into the powder bed, pulling in additional powder into the melt pool. The increased melt pool depth and size may generally result in a poor surface finish of the component. In addition, in some known additive manufacturing systems, the component's dimensional accuracy and small feature resolution may be reduced due to melt pool variations because of the variability of thermal conductivity of the subsurface structures and metallic powder. As the melt pool size varies, the accuracy of printed structures can vary, especially at the edges of features.

BRIEF DESCRIPTION

In one aspect, a method of fabricating a component in a powder bed is provided. The method includes moving a laser array across the powder bed. The laser array includes a plurality of laser devices. The method also includes independently controlling a power output of each laser device of the plurality of laser devices. Moreover, the method includes emitting a plurality of energy beams from a plurality of selected laser devices of the plurality of laser devices to generate a melt pool. In addition, the method includes generating a non-uniform energy intensity profile from the plurality of selected laser devices. The non-uniform energy intensity profile facilitates generating a melt pool having a predetermined characteristic.

In another aspect, an additive manufacturing system is provided. The additive manufacturing system includes a laser array having a plurality of laser devices, where each laser device is configured to generate a melt pool in a layer of powdered material. The additive manufacturing system also includes an actuator system configured to move the laser array across the layer of powdered material. In addition, the additive manufacturing system includes a controller configured to generate control signals to independently control a power output of each laser device. The controller also transmits the control signals to each laser device to emit a plurality of energy beams from a plurality of selected laser devices to generate the melt pool. Furthermore, the controller is configured to generate a non-uniform energy intensity profile from the plurality of selected laser devices. The non-uniform energy intensity profile facilitates generating the melt pool having a predetermined characteristic.

DRAWINGS

These and other features, aspects, and advantages of the present disclosure will become better understood when the following detailed description is read with reference to the accompanying drawings in which like characters represent like parts throughout the drawings, wherein.

Figure 1:
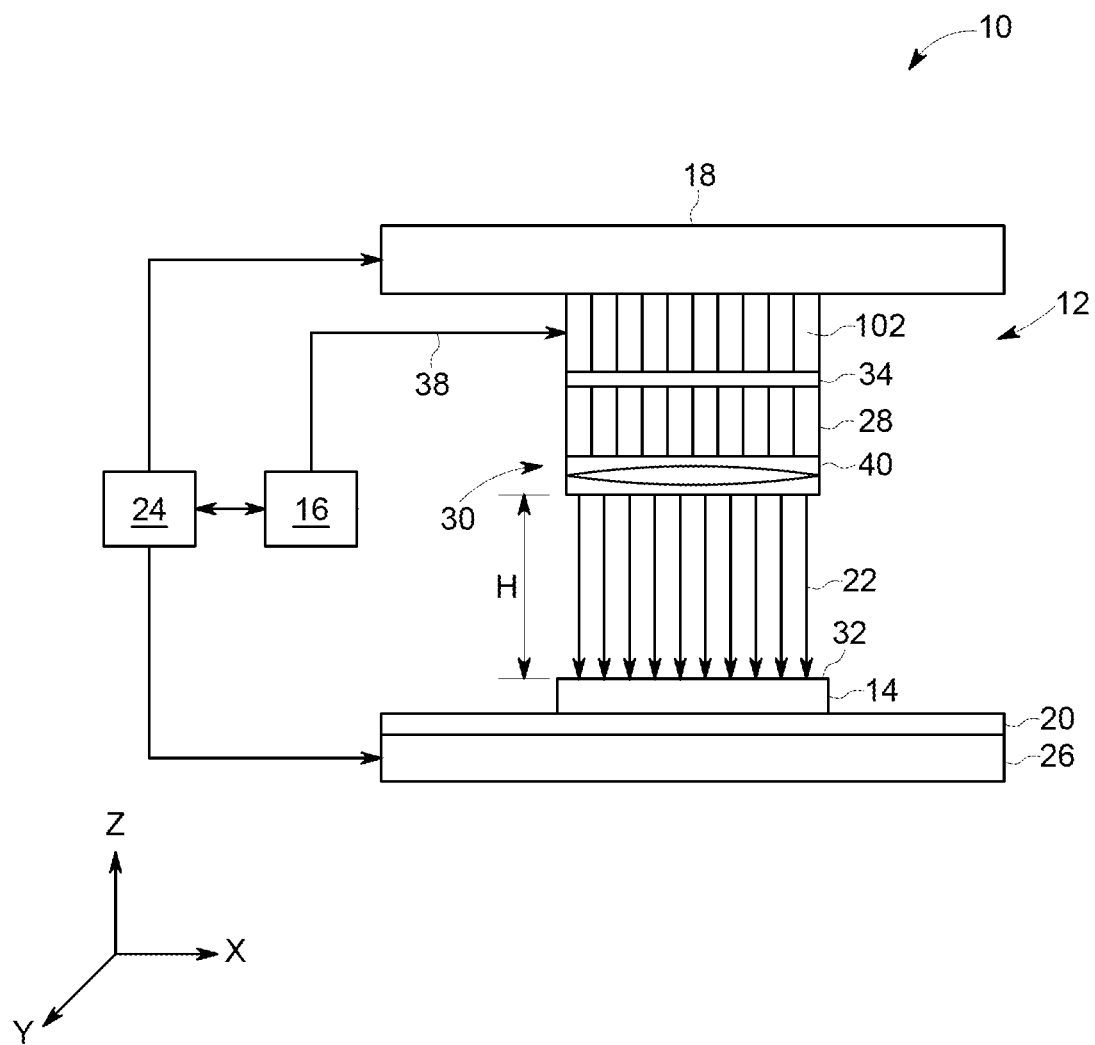
FIG. 1 is a schematic view of an additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "processor" and "computer" and related terms, e.g., "processing device," "computing device," and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein facilitate independently controlling individual lasers arranged in an array to generate a desired or predetermined non-uniform energy intensity profile across a portion of the laser array to facilitate generating a generally flat melt pool profile. Specifically, an additive manufacturing system that includes an array of individually controllable lasers is described and can be used to process large areas for additive manufacturing of components. A control system adjusts the output power of each laser in the array individually to facilitate generating unique melt pool characteristics and profiles formed during component manufacture, which relates directly to component quality. A non-uniform energy intensity profile facilitates reacting to different thermal loss rates and is used to generate a generally consistent melt pool profile. For example, the control system adjusts the output power of each laser in the array individually to dynamically alter characteristics of the melt pool depending on part geometry. For example, the melt pool width can be changed by controlling the number of individual lasers emitting an energy beam in the array and a depth of the melt pool can be adjusted by changing the laser power profile.

In operation, control of the additive manufacturing system includes using build parameters from a three dimensional (3D) computer model to fabricate a component. The lasers of the laser array of the additive manufacturing machine heats a powdered metal to form a melt pool. A controller coupled to the additive manufacturing machine controls operation of the laser array and/or the powder bed to guide the laser array output, and thereby the resulting melt pool, along a predetermined path in the powdered metal. As the laser array traverses the predetermined path, the melt pool cools, forming a hardened metal structure. In one embodiment, each laser device of the laser array receives an independent control signal configured to adjust an amount of output power. The independent control signals vary to control the output power of the individual lasers as the laser array is traversed across the build platform, i.e., based on the absolute position of each laser device. The non-uniform energy intensity profile can be adjusted to generate desired melt pool characteristics, such as, for example, consistent melting depth and or size. For example, and without limitation, the non-uniform energy intensity profile can be adjusted to include increased power at the laser array ends and decreased power in the central region of the laser array to compensate for differences in thermal losses across the melt pool. The non-uniform energy intensity profile can be adjusted by turning on or off center laser across the laser array. In another embodiment, a power gradient can be applied to the laser array to compensate for differences in velocity of the lasers while making turns or other complex geometries. In addition, in some embodiments, the laser array includes various laser devices that differ in power, spot size, and/or wavelength to facilitate generating desired non-uniform energy intensity profiles.

Figure 2:
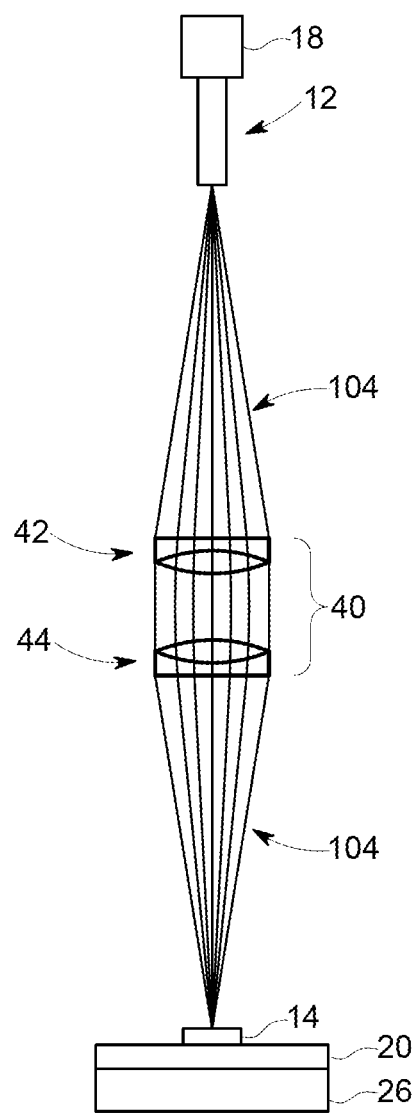
FIG. 2 is a schematic view of coupling optics used for use by a laser array of the additive manufacturing system of FIG. 1.
Figure 3:
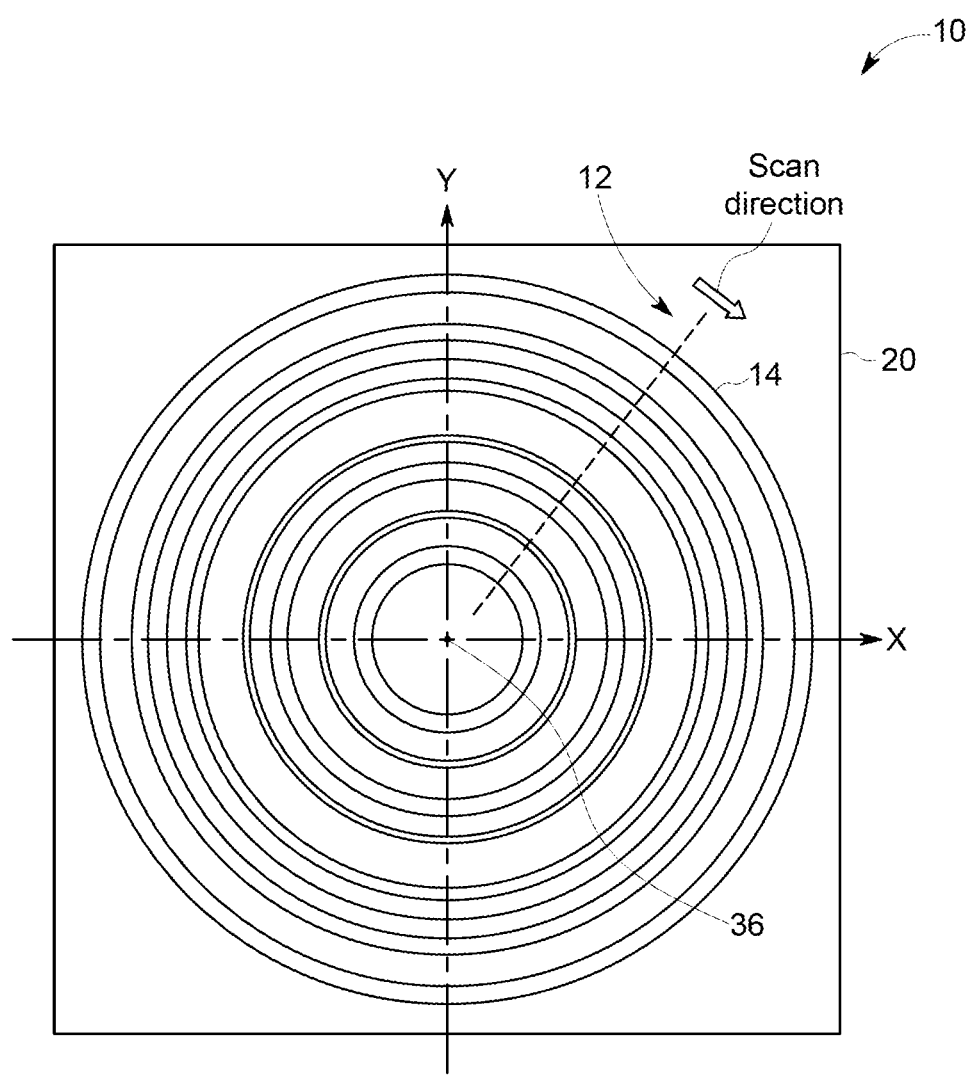
FIG. 3 is a schematic view of the additive manufacturing system of FIG. 1, looking down on a powder bed.

FIG. 1 is a schematic view of an exemplary additive manufacturing system 10. FIG. 2 is a schematic view of the coupling optics used by a laser array 12 of additive manufacturing system 10. FIG. 3 is a schematic view of additive manufacturing system 10 looking down on a powder bed 20. In the exemplary embodiment, additive manufacturing system 10 includes a laser array 12 for fabricating a component 14 by a layer-by-layer manufacturing process on the powder bed 20. Laser array 12 includes a plurality of laser devices, or emitters, 102, each of which provides a high-intensity heat source configured to generate a melt pool in a powdered material via an energy beam 22. Laser array 12 is coupled to a mounting system 18. Additive manufacturing system 10 also includes a computer control system, or controller 16. Mounting system 18 is moved by an actuator or an actuator system 24 that is configured to move mounting system 18, for example in an XY plane, as shown in FIG. 1 to facilitate fabricating a layer of component 14 with one sweep of laser array 12 (i.e., requiring no scanning of laser array 12). For example, and without limitation, laser array 12 is moved in a linear path, a curved path, and/or rotated. Moreover, an orientation of laser array 12 may be varied with respect an orientation of component 14, an orientation of additive manufacturing system 10, and/or a direction of the scan. As shown in FIG. 2, in one particular exemplary embodiment, laser array 12 is pivoted about a center point 36 defined by the geometry of component 14 to cover a circular portion of the powder on powder bed 20 to generate for example, and without limitation, component 14 having substantially circular, thin walls. Alternatively, laser array 12 is moved in any orientation that enables additive manufacturing system 10 to function as described herein. For example, a center point of component 14 may be defined off of powder bed 20 and mounting system 18 may rotate laser array 12 such that it rotates about such an off-bed center point.

Actuator system 24 is controlled by controller 16 and moves laser array 12 along a predetermined path about the powder bed 20, such as, for example, and without limitation, linear and/or rotational paths. Alternatively, laser array 12 is stationary and energy beams 22 are moved along the predetermined path by one or more galvanometer (not shown), for example, and without limitation, two-dimension (2D) scan galvanometers, three-dimension (3D) scan galvanometers, dynamic focusing galvanometers, and/or any other galvanometer system that may be used to deflect energy beams 22 of laser array 12.

In the exemplary embodiment, a powder bed 20 is mounted to a support structure 26, which is moved by actuator system 24. As described above with respect to mounting system 18, actuator system 24 is also configured to move support structure 26 in a Z direction (i.e., normal to a top surface of powder bed 20). In some embodiments, actuator system 24 can also be configured to move support structure 26 in the XY plane. For example, and without limitation, in an alternative embodiment where laser array 12 is stationary, actuator system 24 moves support structure 26 in the XY plane to direct energy beams 22 of laser array 12 along a predetermined path about powder bed 20. In the exemplary embodiment, actuator system 24 includes, for example, and without limitation, a linear motor(s), a hydraulic and/or pneumatic piston(s), a screw drive mechanism(s), and/or a conveyor system.

A height "H" defined between an array of optical fibers 28 (i.e., the free ends 30 of optical fibers 28), or a bundle 34 of optical fibers 28, and a top layer of the powder on powder bed 20 is defined by a focal length of array optics 40 used in laser array 12, i.e., the array of optical fibers 28. Height "H" is predetermined to facilitate focusing energy beams 22 on the top layer of the powder on powder bed 20 to fabricate a top layer 32 of component 14. Powder bed 20 is controlled by moving support structure 26 in the Z direction to facilitate applying a new layer of powder after a layer of component 14 is formed. The height "H" is dependent on, for example, and without limitation, array optics 40 used to focus laser energy beams 22 emitted by optical fibers 28.

In the exemplary embodiment, additive manufacturing system 10 is operated to fabricate component 14 from an electronic representation of the 3D geometry of component 14. The electronic representation may be produced in a computer aided design (CAD) or similar file. The CAD file of component 14 is converted into a layer-by-layer format that includes a plurality of build parameters for each layer of component 14, for example, top layer 32 of component 14. In the exemplary embodiment, component 14 is arranged electronically in a desired orientation relative to the origin of the coordinate system used in additive manufacturing system 10. The geometry of component 14 is sliced into a stack of layers of a desired thickness, such that the geometry of each layer is an outline of the cross-section through component 14 at that particular layer location. A "toolpath" or "toolpaths" are generated across the geometry of a respective layer. The build parameters are applied along the toolpath or toolpaths to fabricate that layer of component 14 from the material used to construct component 14. The steps are repeated for each respective layer of component 14 geometry. Once the process is completed, an electronic computer build file (or files) is generated, including all of the layers. The build file is loaded into controller 16 of additive manufacturing system 10 to control the system during fabrication of each layer.

After the build file is loaded into controller 16, additive manufacturing system 10 is operated to generate component 14 by implementing the layer-by-layer manufacturing process, such as a direct metal laser melting method. The exemplary layer-by-layer additive manufacturing process does not use a pre-existing article as the precursor to the final component, rather the process produces component 14 from a raw material in a configurable form, such as a powder. For example, and without limitation, a steel component can be additively manufactured using a steel powder. Additive manufacturing system 10 enables fabrication of components, such as component 14, using a broad range of materials, for example, and without limitation, metals, ceramics, glass, and polymers.

Figure 4:
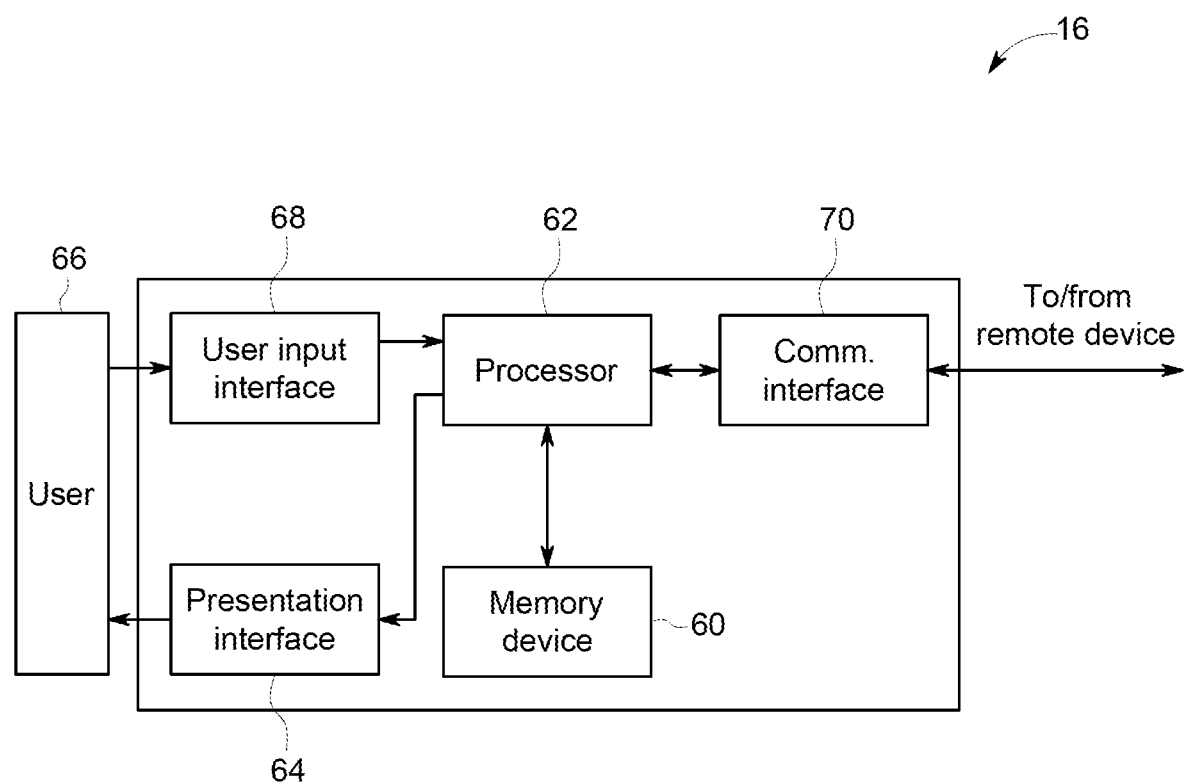
FIG. 4 is a block diagram of a controller that is used to operate the additive manufacturing system shown in FIG. 1.

FIG. 4 is a block diagram of controller 16 that is used to operate additive manufacturing system 10 (shown in FIG. 1). In the exemplary embodiment, controller 16 is one of any type of controller typically provided by a manufacturer of additive manufacturing system 10 to control operation of additive manufacturing system 10. Controller 16 executes operations to control the operation of additive manufacturing system 10 based at least partially on instructions from human operators. Controller 16 includes, for example, a 3D model of component 14 to be fabricated by additive manufacturing system 10. Operations executed by controller 16 include controlling power output of each of the laser devices in laser array 12 and adjusting mounting system 18 and/or support structure 26, via actuator system 24, to control the scanning speed of laser array 12 within additive manufacturing system 10.

In the exemplary embodiment, controller 16 includes a memory device 60 and a processor 62 coupled to memory device 60. Processor 62 may include one or more processing units, such as, without limitation, a multi-core configuration. Processor 62 is any type of processor that permits controller 16 to operate as described herein. In some embodiments, executable instructions are stored in memory device 60. Controller 16 is configurable to perform one or more operations described herein by programming processor 62. For example, processor 62 may be programmed by encoding an operation as one or more executable instructions and providing the executable instructions in memory device 60. In the exemplary embodiment, memory device 60 is one or more devices that enable storage and retrieval of information such as executable instructions or other data. Memory device 60 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 60 may be configured to store any type of data, including, without limitation, build parameters associated with component 14. In some embodiments, processor 62 removes or "purges" data from memory device 60 based on the age of the data. For example, processor 62 may overwrite previously recorded and stored data associated with a subsequent time or event. In addition, or alternatively, processor 62 may remove data that exceeds a predetermined time interval. In addition, memory device 60 includes, without limitation, sufficient data, algorithms, and commands to facilitate monitoring of build parameters and the geometric conditions of component 14 being fabricated by additive manufacturing system 10.

In some embodiments, controller 16 includes a presentation interface 64 coupled to processor 62. Presentation interface 64 presents information, such as the operating conditions of additive manufacturing system 10, to a user 66. In one embodiment, presentation interface 64 includes a display adapter (not shown) coupled to a display device (not shown), such as a cathode ray tube (CRT), a liquid crystal display (LCD), an organic LED (OLED) display, or an "electronic ink" display. In some embodiments, presentation interface 64 includes one or more display devices. In addition, or alternatively, presentation interface 64 includes an audio output device (not shown), for example, without limitation, an audio adapter or a speaker (not shown).

In some embodiments, controller 16 includes a user input interface 68. In the exemplary embodiment, user input interface 68 is coupled to processor 62 and receives input from user 66. User input interface 68 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 64 and user input interface 68.

In the exemplary embodiment, a communication interface 70 is coupled to processor 62 and is configured to be coupled in communication with one or more other devices, such as laser array 12, and to perform input and output operations with respect to such devices while performing as an input channel. For example, communication interface 70 may include, without limitation, a wired network adapter, a wireless network adapter, a mobile telecommunications adapter, a serial communication adapter, or a parallel communication adapter. Communication interface 70 may receive a data signal from or transmit a data signal to one or more remote devices. For example, in some embodiments, communication interface 70 of controller 16 may transmit/receive a data signal to/from actuator system 24.

Presentation interface 64 and communication interface 70 are both capable of providing information suitable for use with the methods described herein, such as, providing information to user 66 or processor 62. Accordingly, presentation interface 64 and communication interface 70 may be referred to as output devices. Similarly, user input interface 68 and communication interface 70 are capable of receiving information suitable for use with the methods described herein and may be referred to as input devices.

Figure 5:
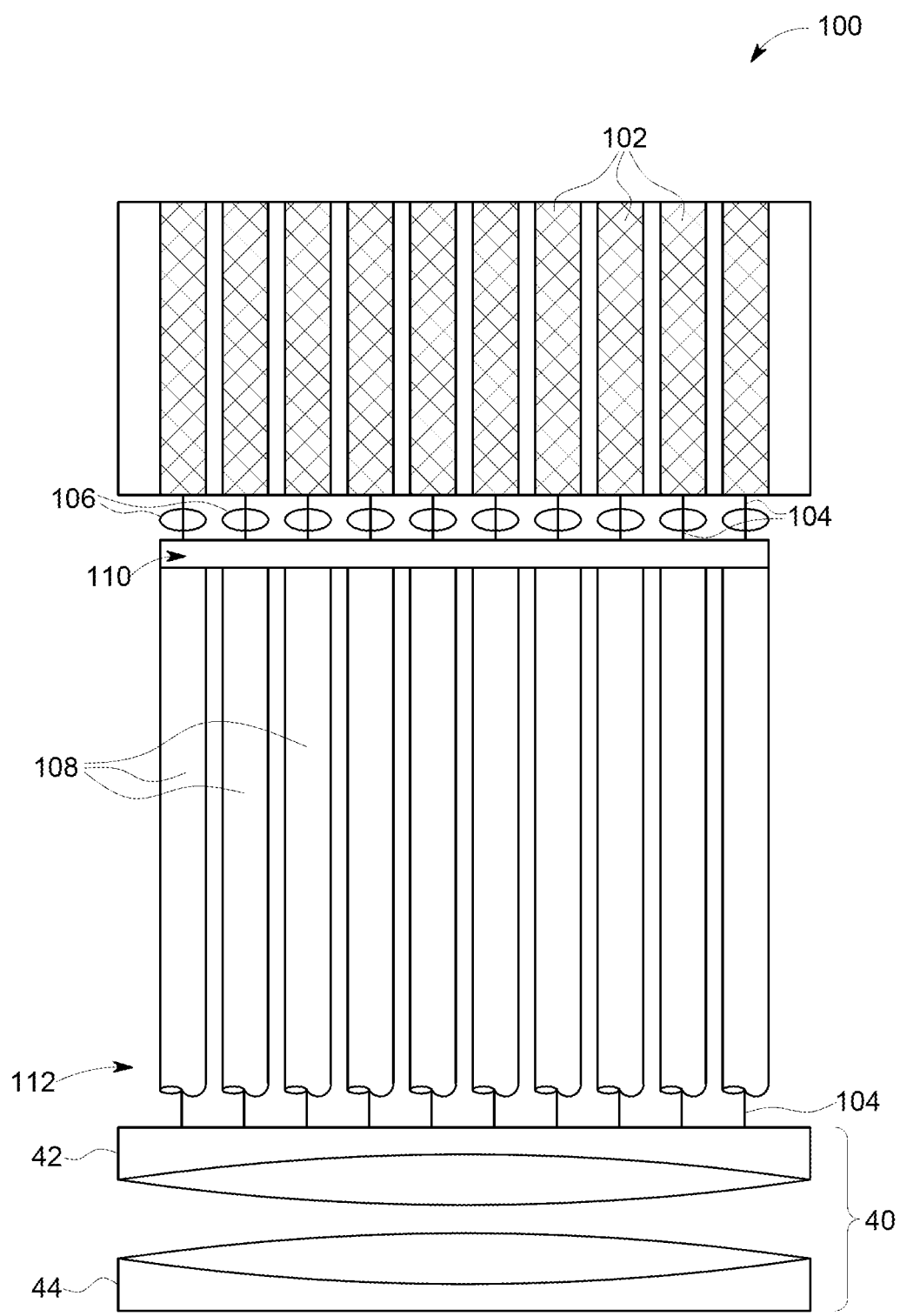
FIG. 5 is a schematic of an exemplary laser array for use with the additive manufacturing system shown in FIG. 1.

FIG. 5 is a schematic of an exemplary laser array 100 for use with additive manufacturing system 10 (shown in FIG. 1). In the exemplary embodiment, laser array 100 includes the plurality of laser devices 102, each of which provides a high-intensity heat source configured to generate a melt pool in a powdered material. Each laser device 102 is configured to emit an energy beam 104 of laser energy. Laser array 100 also includes a plurality of lenses 106 positioned between laser devices 102 and a plurality of optical fibers 108. Lenses 106 are configured to couple energy beam 104 emitted by a respective laser device 102 to a respective optical fiber 108. In the exemplary embodiment, optical fibers 108 are provided in a bundle 110 between laser devices 102 and free ends 112 of optical fibers 108. In alternative embodiments, laser array 100 includes laser devices that do not use coupling optics, such as lenses 106, as discussed herein.

Laser array 100 also includes array optics 40, as discussed herein. In the exemplary embodiment, array optics 40 includes a pair of doublets 42, 44, and in particular achromatic doublets, configured to be shared by each laser device 102 of laser array 100. Array optics 40 are configured to focus and manipulate, for example, energy beams 104 to facilitate fabricating component 14 on powder bed 20.

Figure 6:
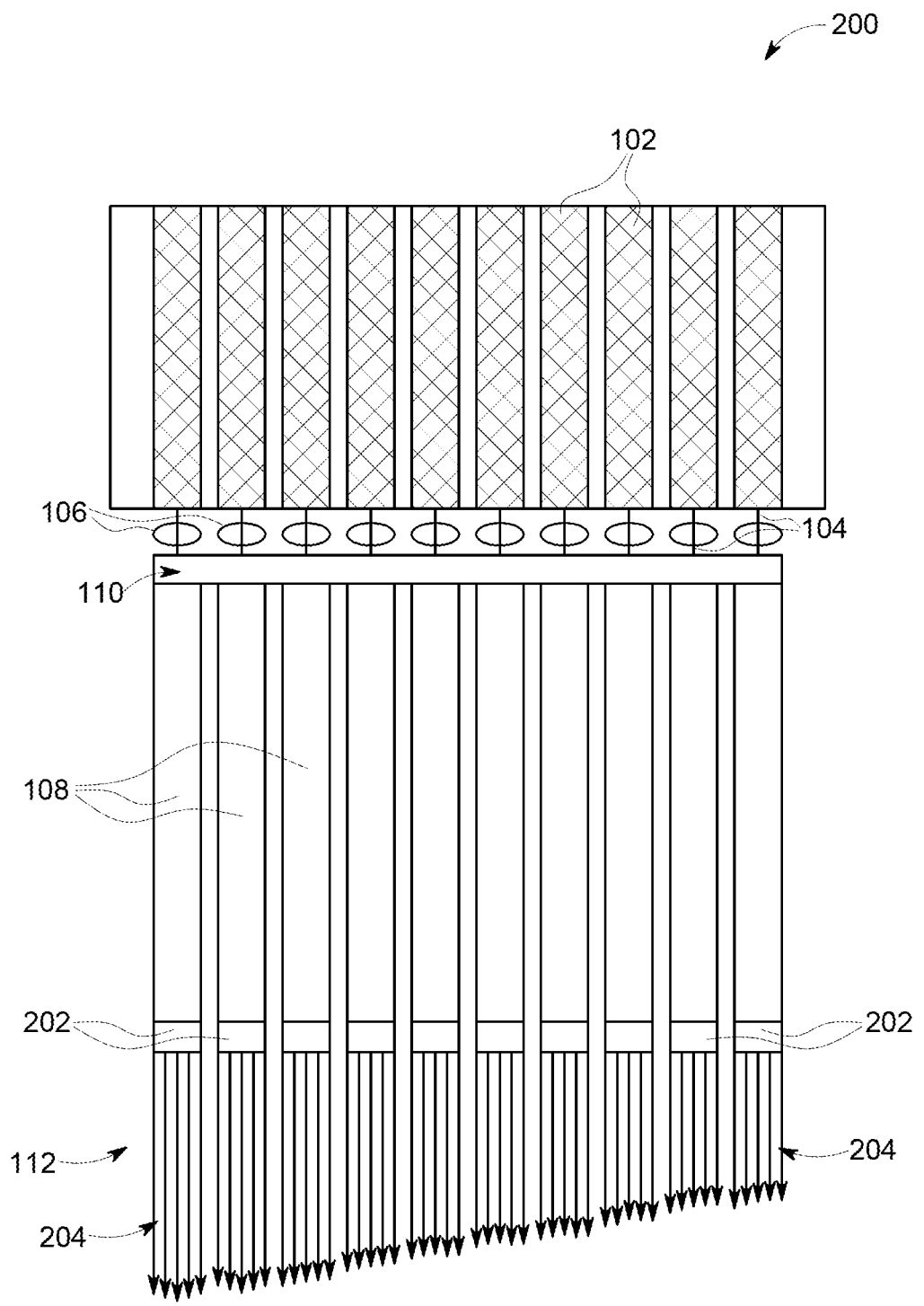
FIG. 6 is a schematic of an alternative laser array for use with the additive manufacturing system shown in FIG. 1.

FIG. 6 is a schematic of an alternative laser array 200 for use with additive manufacturing system 10 (shown in FIG. 1). In the exemplary embodiment, laser array 200 includes a plurality of lenses 202 optically coupled to optical fibers 108 at free ends 112. Lenses 202 are configured to generate collimated energy beams 204 emitted from optical fibers 108. Alternatively, free ends 112 of optical fibers 108 are shaped to provide collimated energy beams 204. Laser array 200 also includes Laser array 200 also includes array optics 40 (shown in FIG. 5) optically coupled to optical fibers 108. As discussed herein, array optics 40 are configured to focus and manipulate, for example, collimated energy beams 204 to facilitate fabricating component 14 on powder bed 20.

FIG. 6 is a schematic of another alternative laser array 300 for use with additive manufacturing system 10 (shown in FIG. 1). In the exemplary embodiment, each laser device 102 is configured to emit energy beam 104. Energy beam 104 emitted by a respective laser device 102 is received directly by a respective optical fiber 108 positioned proximate the respective laser device. Optical fibers 108 include lenses 302 optically coupled to their respective free ends 112. Lenses 302 are configured to generate a divergent energy beam 304 emitted from optical fibers 108. Lenses 302 are shaped to generate a predetermined amount of divergence of energy beam 304. Alternatively, free ends 112 of optical fibers 108 are shaped to provide divergent energy beams 304. As described above with respect to laser arrays 100 and 200, laser array 300 also includes array optics 40 (shown in FIG. 5) optically coupled to optical fibers 108. Array optics 40 are configured to focus and manipulate, for example, divergent energy beams 304 to facilitate fabricating component 14 on powder bed 20.

Figure 7:
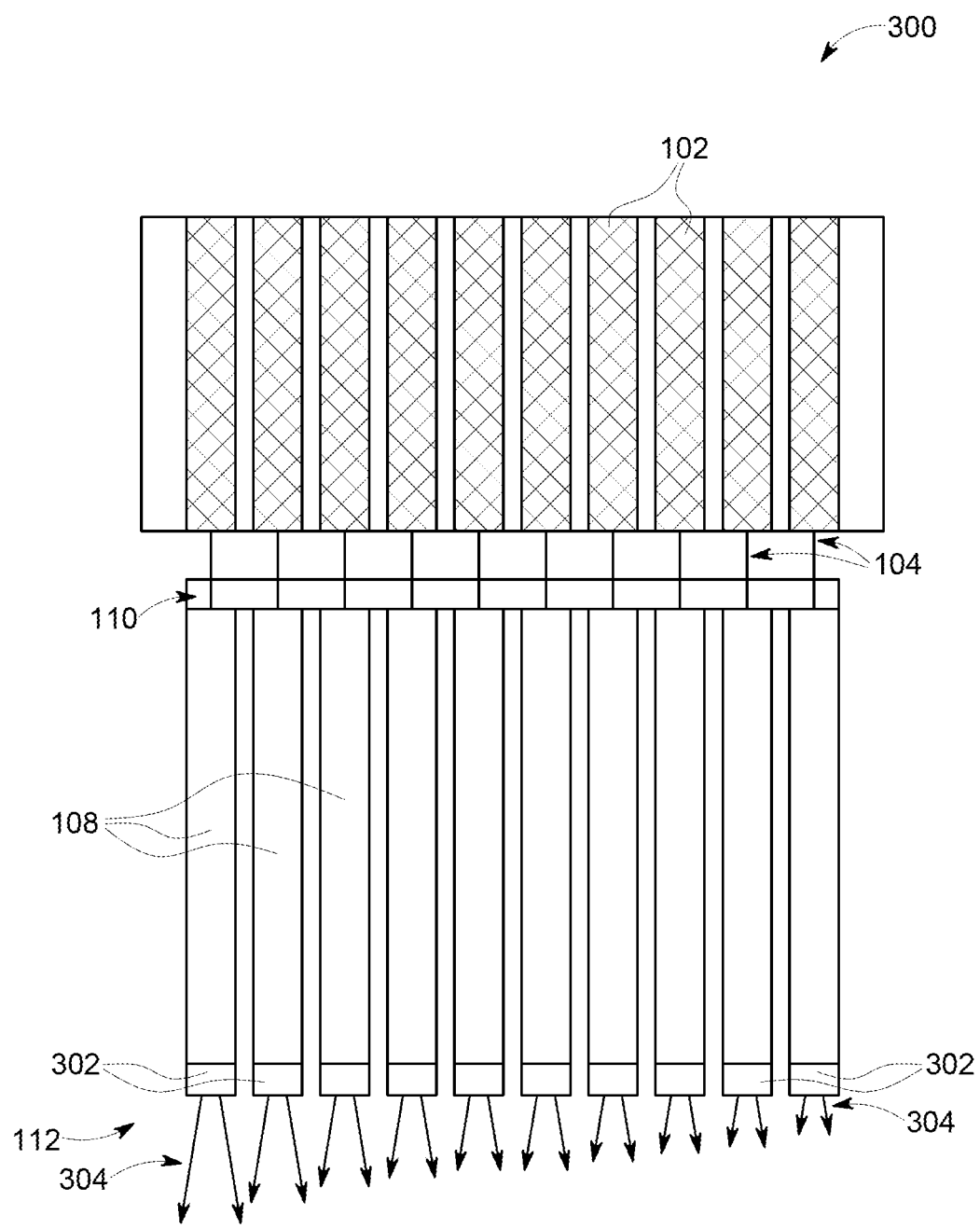
FIG. 7 is schematic of another alternative laser array for use with the additive manufacturing system shown in FIG. 1.
Figure 8:
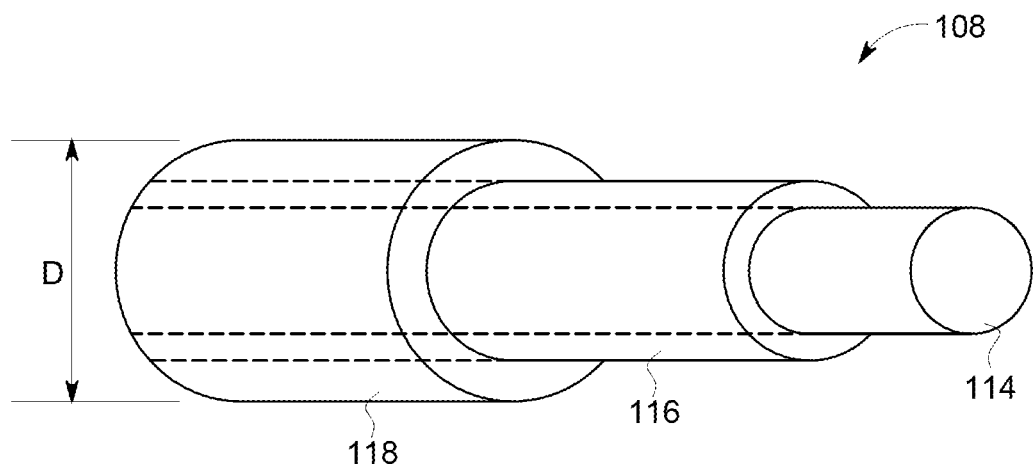
FIG. 8 is a schematic view of a construction of an optical fiber for use with the laser arrays shown in FIGS. 5-7.

FIG. 8 is a schematic view of a construction of optical fiber 108 for use with laser arrays 100, 200, and 300 (shown in FIGS. 5-7). In the exemplary embodiment, the pitch, or relative center positions, of optical fibers 108 is determined based in part on a diameter "D" of optical fibers 108. Optical fiber 108 is a multi-mode fiber having a core 114 fabricated from a substantially transparent material, such as, for example, and without limitation, glass or plastic. Core 114 has a diameter in the range between about 50 micrometers ($\mu m$) (0.002 inches (in)) to about 150 $\mu m$ (0.006 in). Optical fiber 108 also includes a cladding layer 116 surrounding core 114 and fabricated from a substantially transparent material, such as, for example, and without limitation, glass or plastic. Cladding layer 116 has a layer thickness in the range between about 5 $\mu m$ (0.0002 in) to about 30 $\mu m$ (0.001 in). The refractory index of core 114 is greater than the refractory index of cladding layer 116 to create a numerical aperture and provide total internal reflection within optical fiber 108, as is well known in the art. For example, and without limitation, in one embodiment, core 114 has a refractive index of about 1.45 and cladding layer 116 has a refractive index of about 1.43. Alternatively, core 114 and cladding layer 116 can have any refractive index value that enable optical fiber 108 to function as described herein. In the exemplary embodiment, optical fiber 108 also includes a buffer or coating layer 118 that surrounds cladding layer 116. Coating layer 118 is fabricated from a polymer, such as, for example, acrylate or polyimide. Alternatively, coating layer 118 is fabricated from any material than enables optical fiber 108 to function as described herein. In the exemplary embodiment, diameter "D" of coating layer 118 is in the range between about 200 μm (0.008 in) to about 260 μm (0.010 in).

In the exemplary embodiment, optical fiber 108 has a cross-sectional shape that is substantially circular. Alternatively, optical fiber 108 can have nay cross-sectional shape that enables additive manufacturing system 10 to function as described herein. For example, and without limitation, optical fiber 108 can have a cross-sectional shape that is generally square or hexagonal to facilitate increasing fiber packing density.

Figure 9:
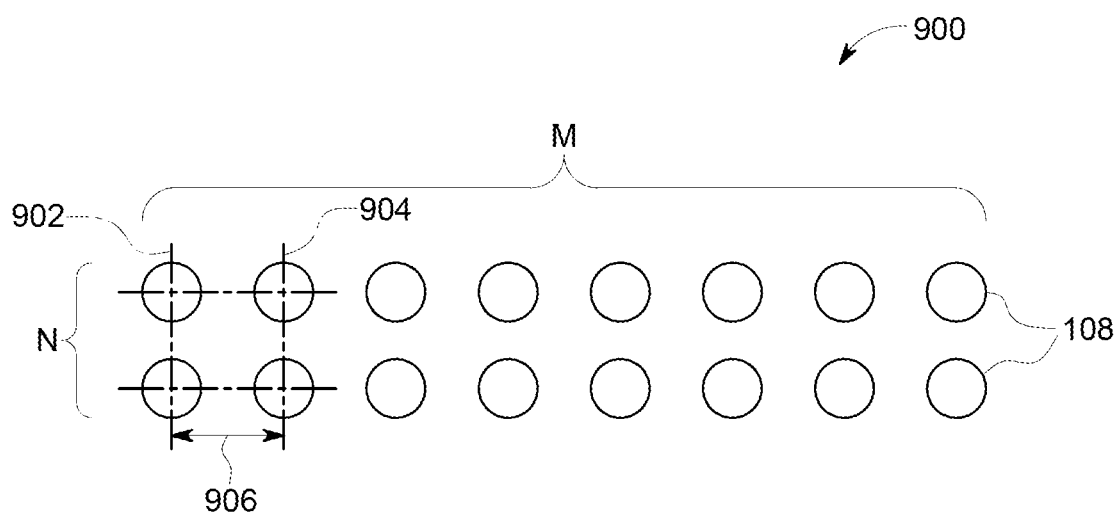
FIG. 9 is a schematic diagram of an array arrangement of the optical fibers for use with the laser arrays shown in FIGS. 5-7.

FIG. 9 is a schematic diagram of an array arrangement 900 of optical fibers 108 for use with laser arrays 100, 200, and 300 (shown in FIGS. 5-7). In the exemplary embodiment, a plurality of optical fibers 108 are arranged in an M×N array arrangement 900, where M represent a number of columns of optical fibers 108 and N represents a number of rows of optical fibers 108. Array arrangement 900 includes two rows N and eight columns M. Alternatively, array arrangement 900 can have any number of columns and rows of optical fibers 108 that enables additive manufacturing system 10 to function as described herein. Furthermore, while array arrangement 900 is illustrated as a generally linear array, it is contemplated that in some embodiments, array arrangement 900 is may be other than a linear array, for example, and without limitation, a curved array and/or an array having any shape that enables laser array 12 to function as described herein. In the exemplary embodiment, rows N are arranged such that each succeeding row is aligned with the previous row, as indicated by centerlines 902 and 904. A distance 906 defined between centerlines 902 and 904 is the pitch of optical fibers 108 in array arrangement 900.

Figure 10:
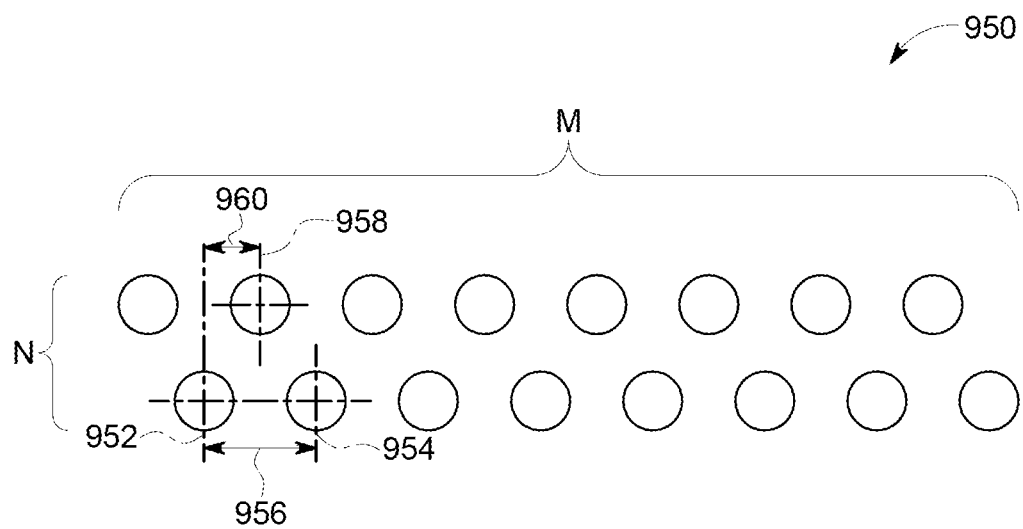
FIG. 10 is a schematic diagram of a row-offset array arrangement of the optical fibers for use with the laser arrays shown in FIGS. 5-7.

FIG. 10 is a schematic diagram of a row-offset array arrangement 950 of optical fibers 108 for use with laser arrays 100, 200, and 300 (shown in FIGS. 5-7). In the exemplary embodiment, a plurality of optical fibers 108 are arranged in a row-offset M×N array arrangement 950, where M represent a number of columns of optical fibers 108 and N represents a number of rows of optical fibers 108. Row-offset array arrangement 950 includes two rows N and sixteen columns M. Alternatively, row-offset array arrangement 950 can have any number of columns and rows of optical fibers 108 that enables additive manufacturing system 10 to function as described herein. Furthermore, while array arrangement 950 is illustrated as a generally linear array, it is contemplated that in some embodiments, array arrangement 950 is may be other than a linear array, for example, and without limitation, a curved array and/or an array having any shape that enables laser array 12 to function as described herein. In the exemplary embodiment, a distance 956 defined between centerlines 952 and 954 is the pitch of optical fibers 108 in a respective row N of row-offset array arrangement 950. Rows N are arranged such that each succeeding row is offset by one-half of pitch 956 from the previous row, as indicated by centerlines 952, 954, and 958. A distance 960 defined between centerlines 952 and 958 is the overall pitch of optical fibers 108 in row-offset array arrangement 950.

With reference to FIGS. 1-10, in the exemplary embodiment, controller 16 actuates a plurality of selected laser devices 102, i.e., one or more of the plurality of laser devices 102 of laser array 12. To generate component 14, the plurality of selected laser devices 102 are operated to generate a melt pool in powder bed 20. In particular, controller 16 controls the operation of each laser device 102 individually, for example, and without limitation, by varying the power output of each laser device 102 using the absolute position of each laser device 102 as it moves across powder bed 20. In the exemplary embodiment, each laser device 102 is one of a continuous, a modulated, or a pulsed wave laser, for example, and without limitation, a diode-pumped ytterbium-doped fiber laser, a fiber-coupled laser diode, a neodymium-doped yttrium aluminum garnet (Nd:YAG) excitation laser, or any other laser that enables fiber array 12 to function as described herein. The power output of laser device 102 can be adjusted, for example, by adjusting pulse width and/or pulse duration of laser device 102, for example, in a pulsed wave laser. In addition, a control signal 38 (or broadly a drive current) can be increased, decreased, and/or modulated to control the power output and/or average power output of a continuous wave laser.

Figure 11:
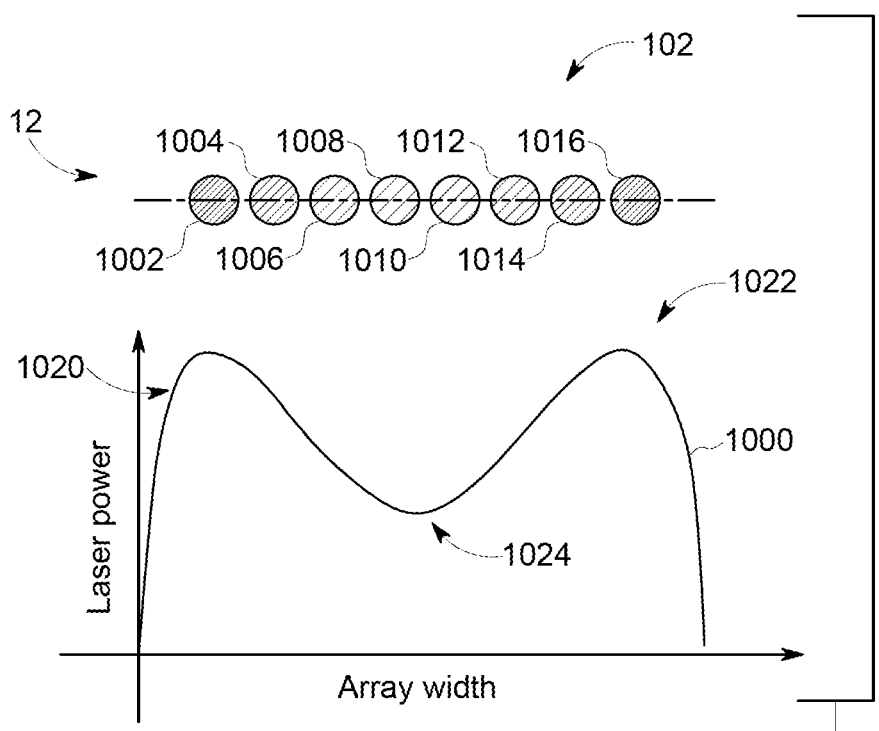
FIG. 11 is a schematic diagram of a non-uniform energy intensity profile emitted by the laser array of the additive manufacturing system shown in FIG. 1.

FIG. 11 is a schematic diagram of a non-uniform energy intensity profile 1000 emitted by laser array 12. In the exemplary embodiment, laser array 12 includes eight adjacent laser devices 102, and in particular, laser devices 1002, 1004, 1006, 1008, 1010, 1012, 1014, 1016, linearly arranged. In some embodiments, laser array 12 includes any number of laser devices 102 that enables laser array 12 to function as described herein. In addition, in some embodiments, laser devices 1002, 1004, 1006, 1008, 1010, 1012, 1014, 1016, illustrated in FIG. 11 are a selected subset of adjacent laser devices 102 of laser array 12. That is, one or more additional laser devices 102 are arranged about laser devices 1002, 1004, 1006, 1008, 1010, 1012, 1014, 1016, for example, in a continued linear arrangement.

In the exemplary embodiment, controller 16 (shown in FIG. 1) simultaneously regulates or controls the control signals 38 to each individual laser device 1002, 1004, 1006, 1008, 1010, 1012, 1014, 1016, to control non-uniform output intensity profile 1000, based in part, on the absolute position of each laser device 102 as it moves across powder bed 20. In the exemplary embodiment, outer edge laser devices 1002 and 1016 are driven by controller 16 to output more energy than laser devices 1004, 1006, 1008, 1010, 1012, 1014 positioned therebetween. Similarly, laser devices 1004 and 1014 are driven by controller 16 to output more energy than laser devices 1006, 1008, 1010, and 1012 positioned therebetween. Laser devices 1006 and 1012 are driven by controller 16 to output more energy than laser devices 1008 and 1010, which are driven to output the least amount of energy in laser array 12. As illustrated by non-uniform energy intensity profile 1000, an amount of power output across laser array 12 varies, increasing from no power at a side of laser array 12 to a peak amount corresponding to laser device 1002. The amount of power then decreases as non-uniform energy intensity profile 1000 moves across laser devices 1004, 1006, and 1008. At a point between laser devices 1008 and 1010, non-uniform energy intensity profile 1000 begins to increase in power as it moves across laser devices 1010, 1012, 1014, and 1016. Non-uniform energy intensity profile 1000 drops to no power at the edge of laser array 12. As such, non-uniform energy intensity profile 1000 provides a pair of outer regions 1020, 1022 having increased power output relative to a central region 1024 having decreased power output to facilitate reducing excess heating of the powder on powder bed 20 and generating a melt pool characteristic such as a generally flat depth profile. The width of non-uniform energy intensity profile 1000 (i.e., the number of laser devices 102 used to generate non-uniform energy intensity profile 1000) varies based on the geometry of component 14 and is controlled, in part, based on the absolute position of each laser device 102 as it moves across powder bed 20.

Figure 12:
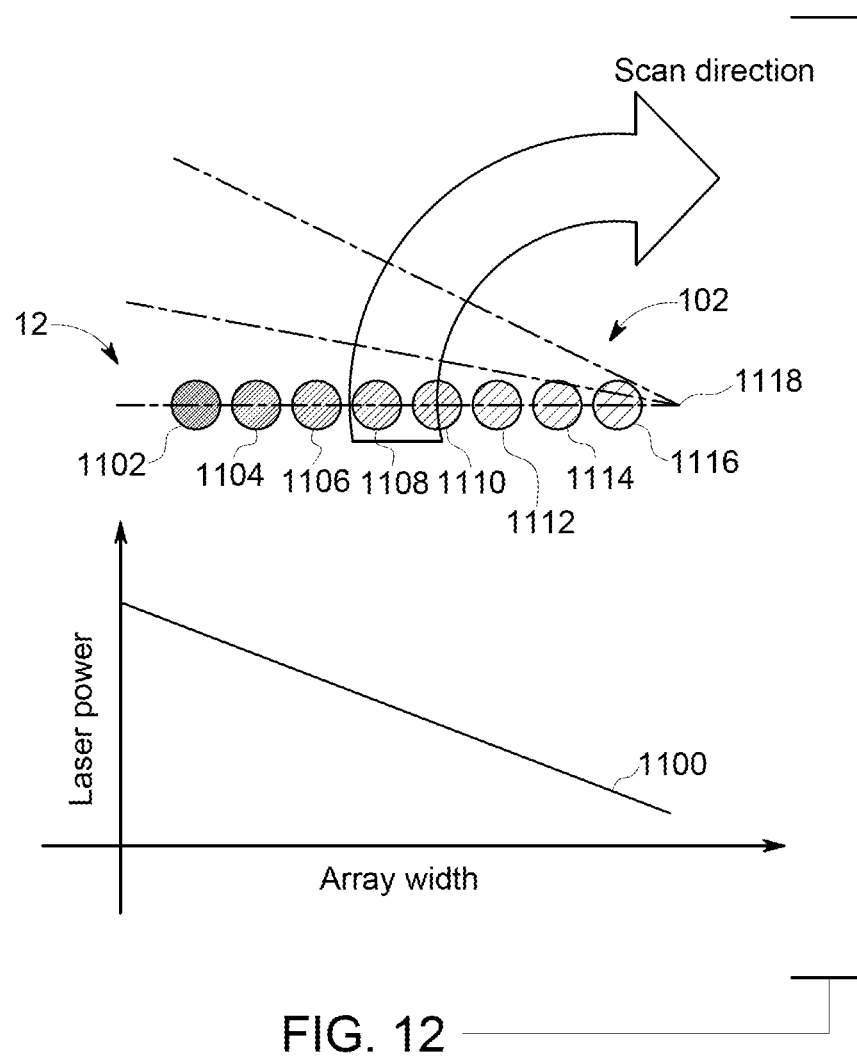
FIG. 12 is a schematic diagram of an alternative non-uniform energy intensity profile emitted by laser array of the additive manufacturing system shown in FIG. 1.

FIG. 12 is a schematic diagram of an alternative non-uniform energy intensity profile 1100 emitted by laser array 12. In the exemplary embodiment, laser array 12 includes eight adjacent laser devices 102, and in particular, laser devices 1102, 1104, 1106, 1108, 1110, 1112, 1114, 1116, linearly arranged. In some embodiments, laser array 12 includes any number of laser devices 102 that enables laser array 12 to function as described herein. In addition, in some embodiments, laser devices 1102, 1104, 1106, 1108, 1110, 1112, 1114, 1116 illustrated in FIG. 12 are a selected subset of adjacent of laser devices 102 of laser array 12. That is, one or more additional laser devices 102 are arranged about laser devices 1102, 1104, 1106, 1108, 1110, 1112, 1114, 1116, for example, in a continued linear arrangement.

In the exemplary embodiment, controller 16 (shown in FIG. 1) simultaneously regulates or controls the control signals 38 to each individual laser device 1102, 1104, 1106, 1108, 1110, 1112, 1114, 1116 to control non-uniform output intensity profile 1100. In the exemplary embodiment, individual laser devices 1102, 1104, 1106, 1108, 1110, 1112, 1114, 1116 are driven by controller 16 to output a power gradient across laser array 12. In particular, as shown in FIG. 12, laser device 1102 is driven by controller 16 to output the largest amount of energy of the array. Each subsequent laser device 1104, 1106, 1108, 1110, 1112, 1114, 1116, progressing from laser device 1104 to laser device 1116 is driven to output a reduced amount of energy in reference to the previous laser device. As such, non-uniform energy intensity profile 1100 decreases from a maximum amount of power corresponding to laser device 1102 to a minimum amount of power corresponding to laser device 1116. While non-uniform energy intensity profile 1100 is illustrated as a decreasing linear curve, it is contemplated that non-uniform energy intensity profile 1100 can have concave or convex shaped slope, representing a decreasing or increasing power output across laser array 12. Non-uniform energy intensity profile 1100 provides a power gradient to facilitate reducing excess heating of the powder on powder bed 20 at locations in the powder where a portion of laser array 12 traverses powder bed 20 at a reduced speed relative to other portion of laser array 12. For example, and without limitation, as laser array 12 is pivoted about center point 1118, in the scan direction as indicted, laser device 1116 moves across powder bed at a substantially slower rate than laser device 1102. Non-uniform energy intensity profile 1100 facilitates generating a melt pool a characteristic such as having a generally flat depth profile during curved paths of laser array 12. As described herein, the width of non-uniform energy intensity profile 1100 (i.e., the number of laser devices 102 used to generate non-uniform energy intensity profile 1000) varies based on the geometry of component 14 and is controlled, in part, based on the absolute position of each laser device 102 as it moves across powder bed 20.

Figure 13:
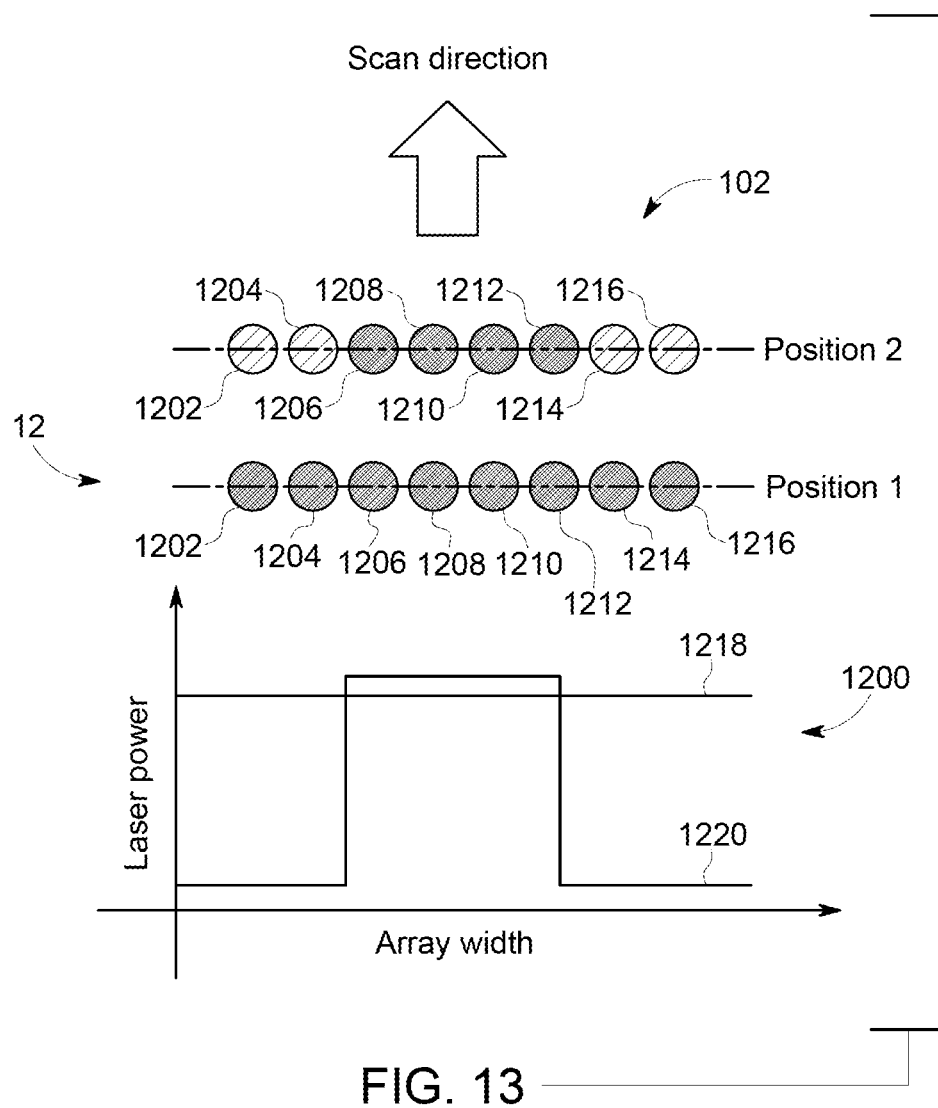
FIG. 13 is a schematic diagram of a toggle method of power output emitted by the laser array of the additive manufacturing system shown in FIG. 1.

FIG. 13 is a schematic diagram of a toggle method 1200 of power output emitted by laser array 12. In the exemplary embodiment, laser array 12 includes eight adjacent laser devices 102, and in particular, laser devices 1202, 1204, 1206, 1208, 1210, 1212, 1214, 1216, linearly arranged. In some embodiments, laser array 12 includes any number of laser devices 102 that enables laser array 12 to function as described herein. In addition, in some embodiments, laser devices 1202, 1204, 1206, 1208, 1210, 1212, 1214, 1216 illustrated in FIG. 13 are selected subset of adjacent of laser devices 102 of laser array 12. That is, one or more additional laser devices 102 are arranged about laser devices 1202, 1204, 1206, 1208, 1210, 1212, 1214, 1216, for example, in a continued linear arrangement.

In the exemplary embodiment, controller 16 (shown in FIG. 1) simultaneously regulates or controls the control signals 38 to each individual laser device 1202, 1204, 1206, 1208, 1210, 1212, 1214, 1216 to control power output of laser array 12. Laser array 12 is shown in two positions, indicated generally as position 1 and position 2. Position 2 is indicative of a position of laser array 12 at a subsequent point in time relative to position 1, such as during the fabrication of component 14. At position 1, the set of laser devices 1202, 1204, 1206, 1208, 1210, 1212, 1214, 1216 are driven by controller 16 to output generally an equal amount of energy as indicated by an energy intensity profile 1218. Alternatively, laser devices 1202, 1204, 1206, 1208, 1210, 1212, 1214, 1216 are driven to provide any amount of energy corresponding to a build parameter, e.g., a geometry, of component 14 (shown in FIGS. 1 and 2), for example, and without limitation, laser devices 1202, 1204, 1206, 1208, 1210, 1212, 1214, 1216 have one of non-uniform energy intensity profile 1000, non-uniform energy intensity profile 1100, or any other intensity profile that enables laser array 12 to function as described herein. At position 2, controller 16 turns off, for example, laser devices 1202, 1204, 1214, and 1216, to define a second set of laser devices 1206, 1208, 1210, 1212. Controller 16 simultaneously regulates or controls the control signal 38 to each individual laser device 1206, 1208, 1210, 1212 to control power output of laser array 12, thereby toggling from energy intensity profile 1218 to an energy intensity profile 1220, which corresponds to a second build parameter of component 14. Energy intensity profile 1220 indicates an output that is generally an equal amount of energy, however, energy intensity profile 1220 can be any energy intensity profile that enables laser array 12 to function as described herein. Toggle method 1200 facilitates rapid changes in energy intensity profiles of laser array 12 to facilitate complex part geometries of component 14, for example, and without limitation, where a thin wall structure extends from a larger structure of component 14. In addition, toggling specific laser devices 102 on or off facilities generating multiple thin walls of a component, for example component 14, using a single large laser array 12 to extends substantially across powder bed 20.

Figure 14:
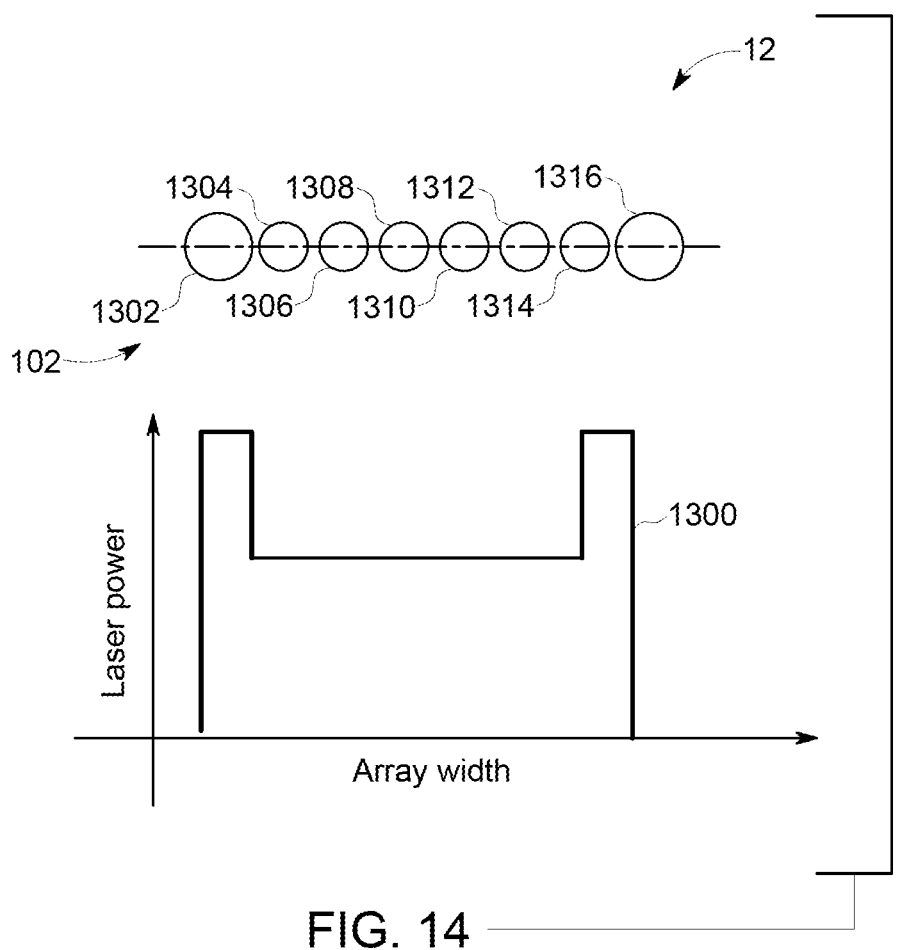
FIG. 14 is a schematic diagram of a non-uniform energy intensity profile emitted by the laser array of the additive manufacturing system shown in FIG. 1.

FIG. 14 is a schematic diagram of a non-uniform energy intensity profile 1300 of power output emitted by laser array 12. In the exemplary embodiment, laser array 12 includes eight adjacent laser devices 102, and in particular, laser devices 1302, 1304, 1306, 1308, 1310, 1312, 1314, 1316 linearly arranged. In some embodiments, laser array 12 includes any number of laser devices 102 that enables laser array 12 to function as described herein. In the exemplary embodiment, laser devices 1302 and 1316 are configured differently than laser devices 1304, 1306, 1308, 1310, 1312, 1314. For example, laser devices 1302 and 1316 can include lasers with increased power outputs, different laser types, different wavelengths, increased spot size and/or distribution, or any other feature that enables laser array 12 to function as described herein.

In the exemplary embodiment, laser devices 1302, 1304, 1306, 1308, 1310, 1312, 1314, 1316 are simultaneously driven by controller 16 to output an amount of power, as indicated by a non-uniform energy intensity profile 1300. Non-uniform energy intensity profile 1300 includes peaks corresponding to laser devices 1302 and 1316, indicating that laser devices 1302 and 1316 are outputting increased amounts of power. Such an arrangement of laser array 12 facilitates providing a non-uniform energy intensity profile without the need of controller 16 to adjust the power output of the outer laser devices. In addition, laser devices 1302 and 1316 can be chosen and/or configured to provide laser energy to powder bed 20 to contour or improve the quality and/or finish of component 14.

The embodiments described herein enable control of each individual laser device of an array of laser independently, according to the properties of the component being fabricated. Individual control the individual laser devices facilitates tailoring a non-uniform output intensity profile to form preferential melt pool characteristics, such as a consistent melting depth. The individual control of the individual laser devices accounts for variations in heating between the laser devices being used to process material at the edge of the laser array compared to the laser devices located in the central region of the laser array, where thermal losses may be substantially different. As such, the laser array can generate an optimized melt pool profile for printing in specific geometries as well as hatching large areas simultaneously. A preferential shallow, wide melt pool can be formed by adjusting the energy output of each laser device of the laser array. The laser array can be increased in size to cover an entire process area by adding additional laser device to the laser array. This facilitates reducing manufacturing time of a component, facilitating reduced manufacturing costs. In addition, the laser array may be a reduced size laser array with a limited number of laser devices, and is moved and/or rotated to facilitate fabricating thin walled components, which facilitates reducing the cost of fabrication of the components. Moreover, the laser array may be assembled from small, inexpensive lasers, further facilitating reducing the costs for fabricating the components.

An exemplary technical effect of the methods, systems, and apparatus described herein includes at least one of: (a) individually controlling each laser device of a laser array; (b) generating a laser array non-uniform energy intensity profile by varying the power output of each laser device of the laser array; and (c) generating a laser array non-uniform energy intensity profile by including a combination of laser devices having different operating parameters in the laser array.

Exemplary embodiments of additive manufacturing systems including a laser array are described above in detail. The systems and methods described herein are not limited to the specific embodiments described, but rather, components of systems and/or steps of the methods may be utilized independently and separately from other components and/or steps described herein. For example, the methods may also be used in combination with other laser fabrication systems and methods, and are not limited to practice with only the systems and methods, as is described herein. Rather, the exemplary embodiments can be implemented and utilized in connection with many additive manufacturing system applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a component in a powder bed, said method comprising:
    moving a laser array across the powder bed, the laser array including a plurality of laser devices arranged in a linear arrangement;
    independently controlling a power output of each laser device of the plurality of laser devices;
    emitting a plurality of energy beams from adjacent laser devices that form a subset of the laser array to generate a melt pool; and
    generating a non-uniform energy intensity profile from the adjacent laser devices of the laser array, wherein the non-uniform energy intensity profile facilitates generating a melt pool having a predetermined characteristic, and wherein generating a non-uniform energy intensity profile comprises:
        controlling the power output of a pair of outer laser devices of the adjacent laser devices to generate a first power output, the pair of outer laser devices positioned at opposite ends of the linear arrangement; and
        simultaneously controlling the power output of at least one laser device positioned between the pair of outer laser devices to generate a second power output less than the first power output, wherein the non-uniform energy intensity profile includes a first outer region, a second outer region, and a central region between the first and second outer regions, the central region having a lower power output than the first and second outer regions, and wherein the first and second outer regions align with the pair of outer laser devices positioned at opposite ends of the linear arrangement.

2. The method in accordance with claim 1, wherein moving the laser array across the powder bed comprises pivoting the laser array about a center point defined by geometry of the component to facilitate fabricating a layer of the component with one sweep of the laser array.

3. The method in accordance with claim 1, wherein moving the laser array across the powder bed comprises one or more of moving the laser array in a linear path, a curved path, rotating the laser array, or adjusting an orientation of the laser array with respect to the powder bed.

4. The method in accordance with claim 1, wherein moving the laser array across the powder bed comprises moving the laser array relative to the powder bed.

5. The method in accordance with claim 1, wherein moving the laser array across the powder bed comprises moving the powder bed relative to a stationary laser array.

6. The method in accordance with claim 1, wherein independently controlling a power output of each laser device of the adjacent laser devices comprises independently controlling one or more of a duration, an average output power, a pulse width, and a pulse duration of each laser device of the adjacent laser devices.

7. The method in accordance with claim 1, wherein independently controlling a power output of each laser device comprises independently controlling the power output of each laser device based on an absolute position of each laser device.

8. The method in accordance with claim 1, wherein emitting a plurality of energy beams from the adjacent laser devices of the plurality of laser devices comprises:
   emitting a plurality of energy beams from a first set of the adjacent laser devices having a first energy intensity profile corresponding to a first build parameter of the component at a first position of the laser array; and
   emitting a plurality of energy beams from a second set of the adjacent laser devices having a second energy intensity profile corresponding to a second build parameter of the component at a second position of the laser array.

9. The method in accordance with claim 1, wherein generating a non-uniform energy intensity profile comprises independently controlling the power output of a first laser device of the laser array and a second laser device of the laser array, the first laser device and the second laser device including different devices.

10. An additive manufacturing system comprising:
   a laser array comprising a plurality of laser devices arranged in a linear arrangement, each laser device of said plurality of laser devices configured to generate a melt pool in a layer of powdered material, said plurality of laser devices comprises a pair of outer laser devices and at least one inner laser device positioned between said pair of outer laser devices, the pair of outer laser devices positioned at opposite ends of the linear arrangement;
   an actuator system configured to move said laser array across the layer of powdered material; and
   a controller configured to:
      generate control signals to independently control a power output of said each laser device;
      transmit the control signals to said each laser device to emit a plurality of energy beams from a plurality of selected laser devices of said plurality of laser devices to generate the melt pool;
      transmit the control signals to said pair of outer laser devices to generate a first power output;
      simultaneously transmit the control signals to said inner laser device to generate a second power output less than the first power output, wherein the non-uniform energy intensity profile includes a first outer region, a second outer region, and a central region between the first and second outer regions, the central region having a lower power output than the first and second outer regions, and wherein the first and second outer regions align with the pair of outer laser devices positioned at opposite ends of the linear arrangement; and
      generate a non-uniform energy intensity profile from said plurality of selected laser devices, wherein the non-uniform energy intensity profile facilitates generating the melt pool having a predetermined characteristic.

11. The system in accordance with claim 10 further comprising a mounting system coupled to said laser array, said actuator system coupled to said mounting system and configured to pivot said laser array about a center point defined by geometry of a component to facilitate fabricating a layer of the component with one sweep of said laser array.

12. The system in accordance with claim 10 further comprising a powder bed and a support structure coupled to said powder bed, said actuator system coupled to said support structure and configured to move said powder bed relative to said laser array.

13. The system in accordance with claim 10, wherein said controller is further configured to transmit the control signals including one or more of a duration, an average output power, a pulse width, and a pulse duration of said each laser device.

14. The system in accordance with claim 10, wherein said controller is further configured to:
   transmit the control signals to a first set of said plurality of selected laser devices to emit a plurality of energy beams having a first energy intensity profile corresponding to a first build parameter of a component at a first position of said laser array; and
   transmit the control signals to a second set of said plurality of selected laser devices to emit a plurality of energy beams having a second energy intensity profile corresponding to a second build parameter of the component at a second position of said laser array.

15. The system in accordance with claim 10, wherein said plurality of laser devices comprises a first laser device and a second laser device, said first laser device comprising a laser device different than said second laser device.

* * * * *